United States Patent Office.

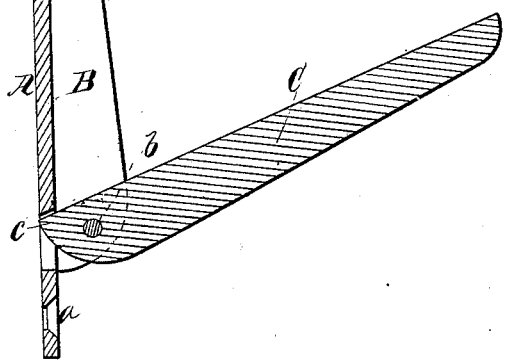
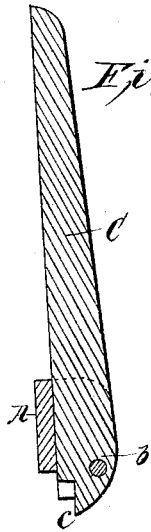
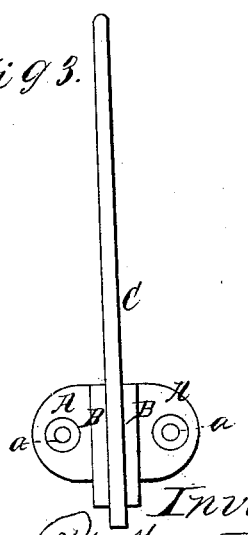

W. WHITNEY, OF SOUTH BERWICK, MAINE, AND JUDSON W. SHAW, OF CONCORD, NEW HAMPSHIRE.

Letters Patent No. 67,620, dated August 6, 1867.

IMPROVED HAT-HOOK FOR PEWS.

The Schedule referred to in these Letters Patent and making part of the same.

TO ALL WHOM IT MAY CONCERN:

Be it known that we, R. W. WHITNEY, of South Berwick, in the county of York, and State of Maine, and J. W. SHAW, of Concord, county of Merrimac, and State of New Hampshire, have invented a new and improved "Pew Hat-Hook;" and we do hereby declare the following to be a full, clear, and exact description thereof, reference being had to the accompanying drawing, making a part of the same, in which—

Figure 1 is a front elevation of our improved hat-hook in its closed or folded position.

Figure 2 is a vertical section of the same, taken in the line $x\,x$, fig. 1, showing the hook in its open or operative position, and Figures 3 and 4 are similar views representing a modification in the construction of the hook and its base or bracket.

Similar letters of reference denote corresponding parts in all the figures.

Our invention has for its object the construction of a hook adapted for use in churches and other places where it is desirable that it should be entirely out of the way when not in use, in such manner as not to offer any obstruction to or catch the dress of persons passing by it; and to this end it consists in mounting the hook upon a horizontal pivot in a flanged bracket adapted to be attached to the backs of pews or other desired point, in such manner that when the hook is not turned down for use, it may be folded up between the flanges of the bracket, and out of the way of passers-by, as hereinafter explained.

To enable others to construct and use our improved hook, we will describe it with reference to the drawings, in which—

A represents the base or bracket, made in any desired form or configuration, and adapted to be secured, either by its sides or ends, as shown at $a\,a$, figs. 1 and 3, to the back of the pew or other desired point. B B are flanges formed upon the base A, perpendicular thereto, and C is the hook located and working between the flanges, and pivoted thereto by means of a horizontal pin or axis, $b$, upon which said hook is free to turn in being thrown outward and downward for use, and upward and between the flanges when it is desired to have it out of the way. The hook is extended slightly beyond its point of pivot to form a stop, $c$, (see figs. 2 and 4;) said stop working in the one case into the slot formed in the bracket, as shown at $a'$; or by the extension of the flanges and fixing of the point of the pivot of the hook slightly below the bar or bracket, the stop $c$ may be allowed to strike and rest against the lower edge of said bracket, as shown in fig. 4, and the hook thereby prevented from being depressed below the proper angle for use. If desired, a small spring, either flat or coiled, may be located in the slot $a'$, or underneath the bracket, or in other suitable position to act upon the hook or upon its stop $c$, in such manner that when the hook is not held down and open for use by the application of pressure or weight thereto, it will be automatically thrown up and closed, and thus be always out of the way except when covered and in use.

The operation of the hook will be readily understood from the above description of its construction.

What we claim as new, and desire to secure by Letters Patent, is—

1. The flanged bracket, in combination with the folding hook, arranged and operating substantially as described.

2. The hook C, arranged to turn upon a horizontal pivot in bracket A, and provided with the stop $c$ operating in combination with said bracket, substantially as described.

In testimony whereof we have hereunto set our hands this 7th day of June, 1867.

R. W. WHITNEY,
JUDSON W. SHAW.

Witnesses:
CHAS. C. LUND,
L. D. STEVENS.